(12) United States Patent
Nakagawa

(10) Patent No.: US 7,970,617 B2
(45) Date of Patent: Jun. 28, 2011

(54) IMAGE PROCESSING APPARATUS AND IMAGE PROCESSING METHOD WITH SPEECH REGISTRATION

(75) Inventor: Kenichiro Nakagawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 928 days.

(21) Appl. No.: 11/871,737

(22) Filed: Oct. 12, 2007

(65) Prior Publication Data
US 2008/0140417 A1 Jun. 12, 2008

(30) Foreign Application Priority Data

Dec. 6, 2006 (JP) .................... 2006-329621

(51) Int. Cl.
*G10L 11/00* (2006.01)
*G10L 21/00* (2006.01)
(52) U.S. Cl. .................... 704/270.1; 704/270
(58) Field of Classification Search ........... 704/270–278
See application file for complete search history.

(56) References Cited

U.S. PATENT DOCUMENTS

| 6,556,971 B1 * | 4/2003 | Rigsby et al. ............ 704/270 |
| 7,158,936 B2 * | 1/2007 | Denenberg et al. ....... 704/270.1 |
| 7,313,525 B1 * | 12/2007 | Packingham et al. ...... 704/270 |

FOREIGN PATENT DOCUMENTS

JP 11-184670 A 7/1999

* cited by examiner

*Primary Examiner* — David R Hudspeth
*Assistant Examiner* — Samuel G Neway
(74) *Attorney, Agent, or Firm* — Canon U.S.A., Inc., IP Division

(57) ABSTRACT

When registering speech onto an object, an information processing apparatus selects identification information from an identification information database and stores information including the object, speech for registration, and the selected identification information in a registration database. When a user performs a speech call, the information processing apparatus outputs identification information that is included in the information called by the user.

12 Claims, 13 Drawing Sheets

FIG. 7
| No | SPEECH BOOKMARK TARGET (COPY SETTING) | SPEECH FOR REGISTRATION | IDENTIFICATION INFORMATION |
|---|---|---|---|
| 1 | CopyRatio :200%<br>CopyNum :12<br>PaperSize :A4<br>Finisher :Auto | Speech01.wav | IC42.jpg <br>IC42.wav |
| 2 | CopyRatio :100%<br>CopyNum :2<br>PaperSize :A3<br>Finisher :Staple | Speech02.wav | IC19.jpg <br>IC19.wav |
| 3 | CopyRatio :144%<br>CopyNum :12<br>PaperSize :A4<br>Finisher :Auto | Speech03.wav | IC27.jpg <br>IC27.wav |
701

FIG. 10

| CopyNum / LENGTH OF SPEAKING TIME | LESS THAN 5 COPIES | GREATER THAN OR EQUAL TO 5 COPIES LESS THAN 10 COPIES | GREATER THAN OR EQUAL TO 10 COPIES |
|---|---|---|---|
| LESS THAN 500mz | IC01, IC02, IC03, IC04 | IC05, IC06, IC07, IC08 | IC09, IC10, IC11, IC12 |
| GREATER THAN OR EQUAL TO 500ms LESS THAN 1000ms | IC13, IC14, IC15, IC16 | IC17, IC18, IC19, IC20 | IC21, IC22, IC23, IC24 |
| GREATER THAN OR EQUAL TO 1000ms | IC25, IC26, IC27, IC28 | IC29, IC30, IC31, IC32 | IC33, IC34, IC35, IC36 |

| No | SPEECH BOOKMARK TARGET (COMMAND SEQUENCE) | SPEECH FOR REGISTRATION | IDENTIFICATION INFORMATION |
|---|---|---|---|
| 1 | a=position();<br>goto(bottom);<br>insert("------");<br>goto(a); | Speech01.wav | IC42.jpg (⚜)<br>IC42.wav |
| 2 | goto(left-end);<br>insert(" > "); | Speech02.wav | IC27.jpg (✴)<br>IC27.wav |

IMAGE PROCESSING APPARATUS AND IMAGE PROCESSING METHOD WITH SPEECH REGISTRATION

BACKGROUND OF THE INVENTION

1. Field of the Invention

The present invention relates to an image processing apparatus which includes a speech recognition function.

2. Description of the Related Art

As devices have become more sophisticated in recent years, the operation procedures of devices have also become more complex. Consequently, there are strong demands for a user interface (UI) that can be operated intuitively by a user who is not used to operating a device.

An example of a UI that can be operated intuitively is speech operation which uses speech recognition. In speech operation, a user speaks a speech command on a microphone of a device, and the device performs a process according to the command. Speech operation has been put into practical use in, for example, car navigation systems and computer telephony integration (CTI) systems.

The vocabulary which a user can speak in most of the speech operation that have been put into practical use includes commands that are originally embedded in the device. However, there is a technique in which a user can register speech onto a specific function or an object, such as an application, a UI layer, or a Uniform Resource Locator (URL). The user can then call the function or the object by speaking the same content as the registered speech (for example, refer to Japanese Patent Application Laid-Open No. 11-184670). Hereinafter, such a technique will be referred to as a "speech bookmark". Moreover, a function or an object to which a speech bookmark can be assigned will be referred to as a "speech bookmark target". Furthermore, the act of assigning speech to a specific function or object is referred to as "speech registration", and the act of calling such a function or an object by speech will be referred to as a "speech calling".

A user who cannot memorize the embedded speech command can use a speech bookmark to register speech that the user can easily remember. Additionally, since a user can register speech by his or her voice, the speech recognition performance increases. This is especially helpful for a user whose voice has a specific feature which is difficult to recognize by using an embedded speech recognition function.

A case where a speech bookmark function is applied to a command sequence is described below. For example, a user registers "my macro 1" by speech onto the following series of command sequence:
1. assign "10" to a variable A
2. assign "20" to a variable B
3. assign "30" to a variable C
Consequently, the command sequence can be executed by only saying (speech calling) "my macro 1", thus improving user-friendliness.

However, a problem arises in that it is difficult to determine whether a command sequence that is actually called is the command sequence the user intended to call.

For example, the user registers "my macro 2" by speech onto the following command sequence, which is slightly different from the previous command sequence:
1. assign "10" to a variable A
2. assign "40" to a variable B
3. assign "30" to a variable C
Generally, misrecognition may be generated in speech recognition (speech calling) such that even if a user calls "my macro 1", the device can interpret the called speech as "my macro 2". In such a case, a series of command sequence corresponding to "my macro 2" is executed. However, the user may not realize that "my macro 2" has been executed instead of "my macro 1".

To solve such a problem, when the user calls a speech bookmark, it is desirable to output to a user identification information, such as an icon, defined for each speech bookmark target. In the above example, if the device recognizes the called speech as "my macro 1", an icon representing "my macro 1" is displayed. If a user calls "my macro 1", and an icon other than that of "my macro 1" is displayed, the user can immediately realize that the called speech is misrecognized.

There are two methods of registering an icon to the speech bookmark target by using conventional techniques:
1. Embedding icon information into the speech bookmark target.
2. Allowing the user to edit an icon, or to select an icon from an icon list in the system, when registering speech.

The first method is used in the bookmark function of a web browser. In a Hyper Text Markup Language (HTML) document on the Web, an icon displayed with a bookmark can be described as follows:
<link rel="shortcut icon"href="shortcut.ico"/>
When a user displays a content which includes the above tag and makes a bookmark registration, the web browser allocates the icon "shortcut.ico" to the bookmark.

If the above method is applied to the speech bookmark, icon information is embedded into the speech bookmark target. Consequently, when the speech bookmark target is called, the icon is displayed so that the speech bookmark target becomes more identifiable from other bookmark targets. However, it is unrealistic to allocate a different icon to each of the speech bookmark targets beforehand. For example, when a macro as described above is a speech bookmark target, a different icon has to be allocated to each of possible combinations of set values.

In the second method, when a user registers a speech bookmark, an icon editing screen is displayed using a graphical user interface (GUI), on which the user can edit or select a identifiable icon. The speech bookmark target becomes more identifiable if the user selects an appropriate icon. However, a user is required to perform an editing or selecting operation when registering a speech bookmark, which can be burdensome.

Therefore, it is difficult to allocate easily-identifiable identification information to a speech bookmark target without burdening a user.

SUMMARY OF THE INVENTION

The present invention is directed to an information processing apparatus which is capable of allocating easily-identifiable identification information to a speech bookmark target with a reduced burden on a user.

According to an aspect of the present invention, an information processing apparatus includes a registration target obtaining unit configured to obtain data to be registered, a first speech obtaining unit configured to obtain speech for registration, a selecting unit configured to select identification information from an identification information database that stores a plurality of identification information when the first speech obtaining unit has obtained the speech for registration, a storing unit configured to store, in a memory, the selected identification information, the speech for registration, and the obtained data to be registered in association with each other, a second speech obtaining unit configured to obtain speech for calling, a search unit configured to search the memory based on the speech for calling obtained by the second speech obtaining unit and to obtain identification information and data to be registered stored in association with speech for registration corresponding to the speech for calling, and a first output unit configured to output the identification information obtained by the search unit.

According to another aspect of the present invention, a method includes obtaining data to be registered, obtaining speech for registration, selecting identification information from an identification information database that stores a plurality of identification information when the speech for registration has been obtained, storing, in a memory, the selected identification information, the speech for registration, and the obtained data to be registered in association with each other, obtaining speech for calling, searching the memory based on the obtained speech for calling to obtain identification information and data to be registered stored in association with speech for registration corresponding to the speech for calling, and outputting the obtained identification information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates an example of a speech bookmark database in a copying machine according to the second exemplary embodiment of the present invention.

FIG. 10 illustrates an example of a table for selecting identification information according to the present invention.

FIG. 13 illustrates an example of a speech bookmark database of a text editor according to the present invention.

DETAILED DESCRIPTION OF THE EMBODIMENTS

Various exemplary embodiments, features, and aspects of the invention will be described in detail below with reference to the drawings.

Figure 1:
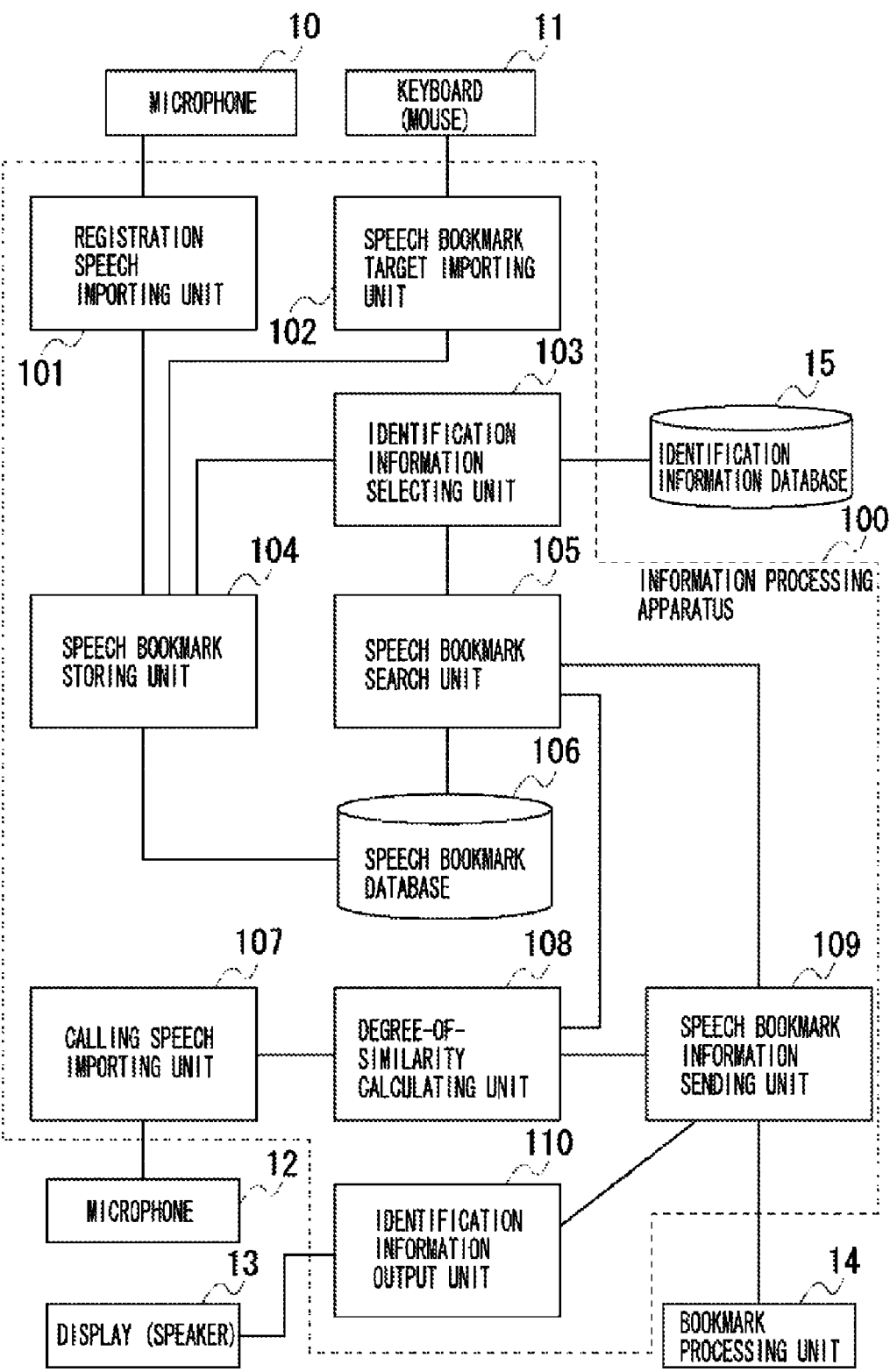
FIG. 1 is a block diagram illustrating a functional configuration of an information processing apparatus according to a first exemplary embodiment of the present invention.
Figure 2:
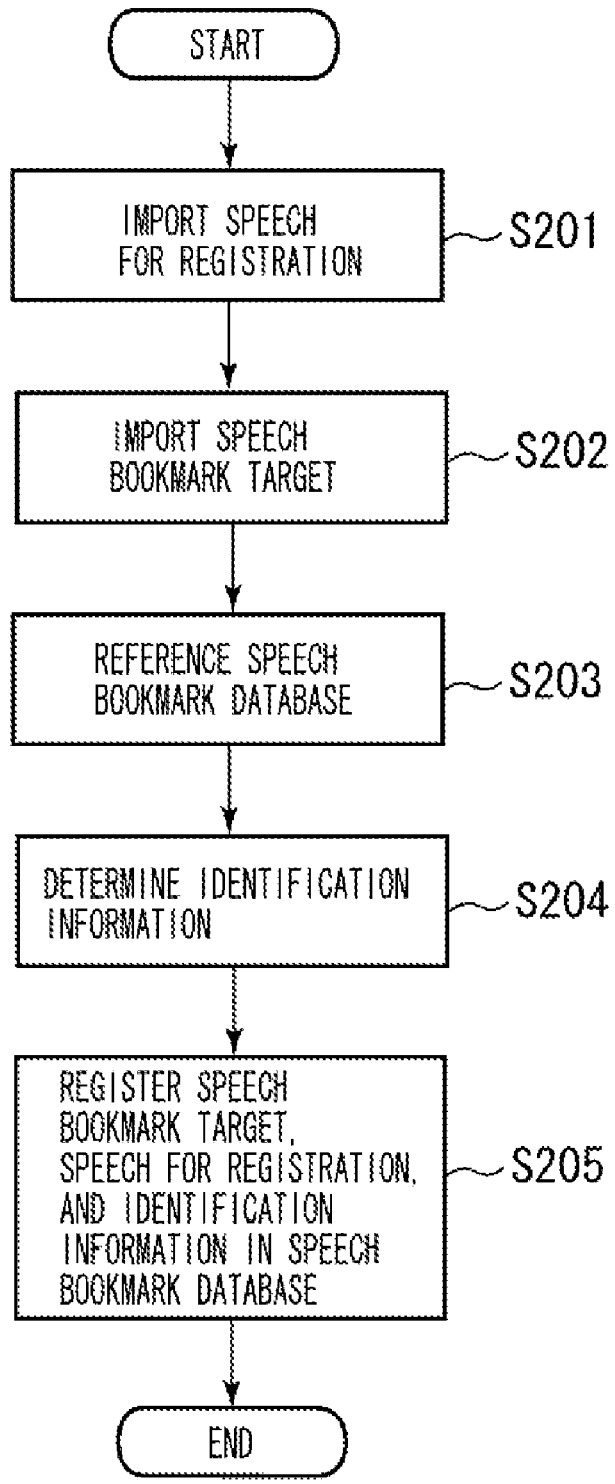
FIG. 2 is a flowchart illustrating a speech bookmark registration process in the information processing apparatus according to the first exemplary embodiment of the present invention.
Figure 3:
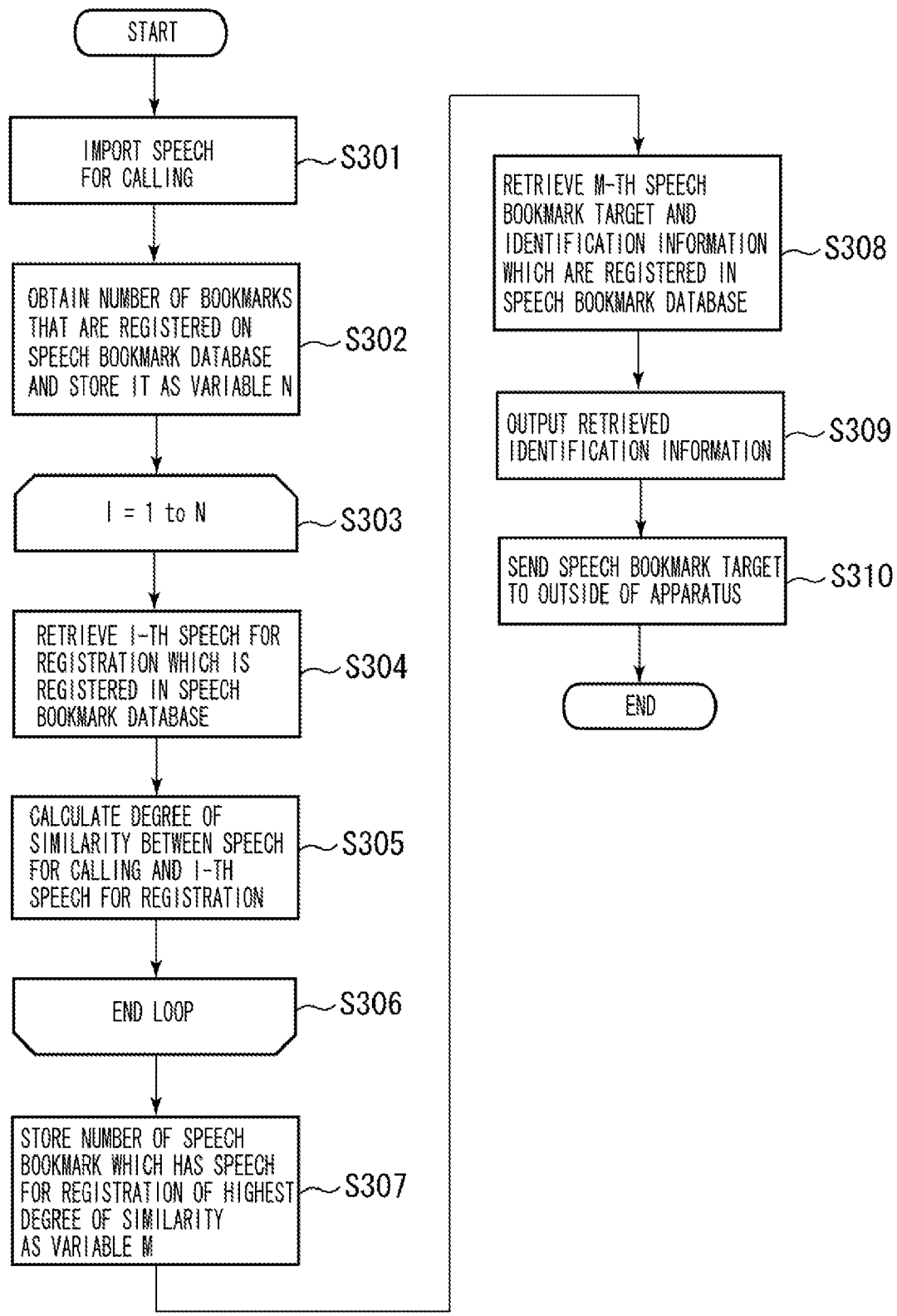
FIG. 3 is a flowchart illustrating a speech bookmark calling process according to the first exemplary embodiment of the present invention.

FIG. 1 is a functional block diagram illustrating an information processing apparatus according to a first exemplary embodiment of the present invention. FIG. 2 is a flowchart illustrating a speech bookmark registration process in the information processing apparatus according to the present embodiment. FIG. 3 is a flowchart illustrating a speech bookmark calling process according to the present embodiment.

The information processing apparatus according to the present exemplary embodiment registers speech onto a speech bookmark target. Consequently, the speech bookmark target can be called by speech. The first half of such process will be referred to as a speech registration phase and the second half as a speech calling phase.

<Speech Registration Phase>

An information processing apparatus 100 illustrated in FIG. 1 enters a speech registration phase according to a user instruction and executes a process illustrated in the flowchart of FIG. 2.

In step S201, the information processing apparatus 100 imports speech for registration. A registration speech importing unit 101 accesses a microphone 10 located outside of the information processing apparatus 100 and imports speech from a user.

In step S202, the information processing apparatus 100 imports a speech bookmark target. The speech bookmark target is an object that can be expressed by software, which is a registration target of a speech bookmark. The content of the speech bookmark target depends on a system in which the information processing apparatus 100 is integrated. For example, the speech bookmark target can be a GUI item (e.g., a button or a menu layer), which a user can designate using a keyboard or mouse 11. Additionally, the speech bookmark target can be information such as a group of settings that is presently displayed on a GUI screen, a URL, a search query, or the name of an application program currently being executed. A speech bookmark target importing unit 102 imports such speech bookmark target.

In step S203, the information processing apparatus 100 references a speech bookmark database. Thus, a speech bookmark search unit 105 references a speech bookmark database 106. The speech bookmark database 106 stores speech bookmark information that has already been registered. One set of speech bookmark information includes at least a speech bookmark target, speech for registration, and registered identification information. The speech for registration can be speech that a user has spoken for registration which is stored as is or which is encoded and stored.

In step S204, the information processing apparatus 100 determines identification information to be used in the present speech bookmark, based on the result of referencing the speech bookmark database 106. The identification information is data to be used in identifying a bookmark, such as an image, sound, text, a vibration pattern, or a flashing pattern of light. The type of identification information to be selected is determined based on the result of referencing the speech bookmark database 106. For example, the identification information can be selected randomly from identification information that is not being used in the present speech bookmark database 106 in an identification information database 15 retained in the system. The identification information can also be selected uniquely according to the order of registration. For example, the N-th identification information is allocated to the N-th registered speech bookmark. The above process is performed by an identification information selecting unit 103.

After the identification information of the speech bookmark is determined, in step S205, the information processing apparatus 100 registers, in the speech bookmark database 106, the speech bookmark information to be newly registered (i.e., a speech bookmark target, speech for registration, and identification information) in association with each other. The above-described process is performed in a speech bookmark storing unit 104. When the speech bookmark information is registered, the speech registration phase of the speech bookmark ends.

<Speech Calling Phase>

The information processing apparatus 100 enters a speech calling phase according to a user instruction and executes the process described in the flowchart illustrated in FIG. 3.

In step S301, the information processing apparatus 100 imports speech for calling. That is, a calling speech importing unit 107 accesses a microphone 12 located outside of the information processing apparatus 100 and imports speech from the user. The microphones 10 and 12 can be the same microphone.

In step S302, the information processing apparatus 100 obtains the number of bookmarks that are registered in the speech bookmark database 106 and stores the number as a variable N. In steps S303 to S306, the information processing apparatus 100 calculates the degree of similarity between the speech for calling and each of all (N) speeches for registration registered in the speech bookmark database 106. The degree of similarity between the speeches can be calculated using a conventional speech recognition technology.

After calculating the degree of similarity, the information processing apparatus 100 stores the number of a speech bookmark, whose speech for registration has the highest degree of similarity, as a variable M in step S307. In step S308, the information processing apparatus 100 retrieves a speech bookmark target and identification information corresponding to the M-th speech bookmark. The above-described series of processes is performed by a degree-of-similarity calculating unit 108.

In step S309, the information processing apparatus 100 outputs the retrieved identification information to the user. Thus, an identification information output unit 110 outputs the identification information via a display or speaker 13 located outside of the information processing apparatus 100. For example, if the retrieved identification information is an image or text information, the identification information is output via a display. If the retrieved identification information is audio data, the identification information is output via a speaker.

In step S310, a speech bookmark information sending unit 109 sends the retrieved speech bookmark target to a bookmark processing unit 14 located outside of the information processing apparatus 100 to execute the speech bookmark. The bookmark processing unit 14 can perform a process corresponding to a bookmark target, which is not limited to a speech bookmark. For example, when a bookmark target is a specific URL, the URL is displayed on a browser. Moreover, if the bookmark target is a specific group of settings, the settings are made on a device. Furthermore, if the bookmark target is a specific application information, the application is executed.

As described above, when a speech registration of a speech bookmark is performed, identification information can be allocated to a speech bookmark target without special operation. Moreover, when a user calls the speech bookmark, the identification information of the speech bookmark can be output. As a result, a user can easily determine whether the desired speech bookmark has been selected.

Figure 4:
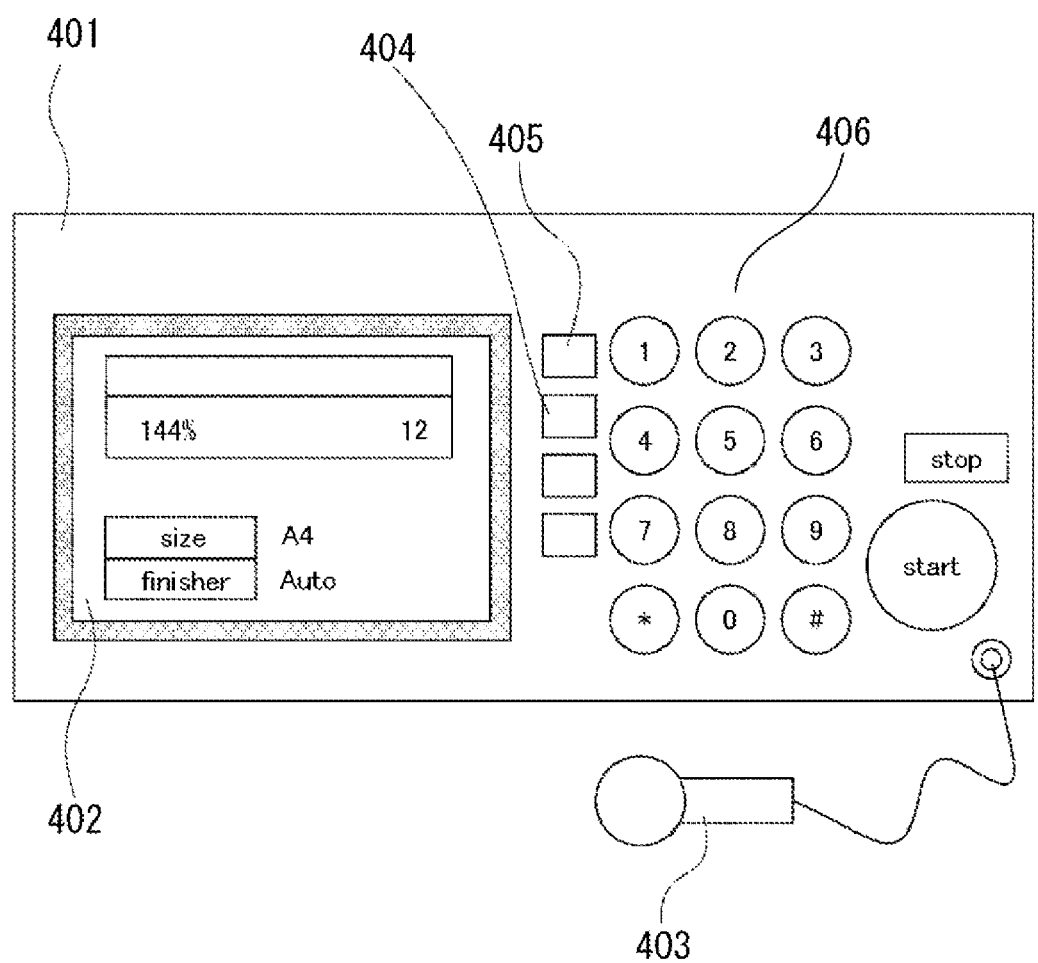
FIG. 4 illustrates an example of an operation panel of a copying machine according to a second exemplary embodiment of the present invention.

A second exemplary embodiment of the present invention is directed to an example in which the present invention is applied to a copying machine. The copying machine according to the present embodiment includes an operation panel 401 as illustrated in FIG. 4. The operation panel 401 includes a numeric keypad 406, a touch screen 402, a microphone 403 for importing user speech, a speech bookmark registration button 404, and a speech bookmark calling button 405.

A user can make a setting for taking a copy by using the above devices. For example, the following setting is made as illustrated in FIG. 4.

Copy ratio: 144%
Number of copies: 12 copies
Paper size: A4
Finisher setting: Auto The copying machine according to the present embodiment can set the above group of settings as a speech bookmark target. <Speech Registration Phase>

Figure 5:
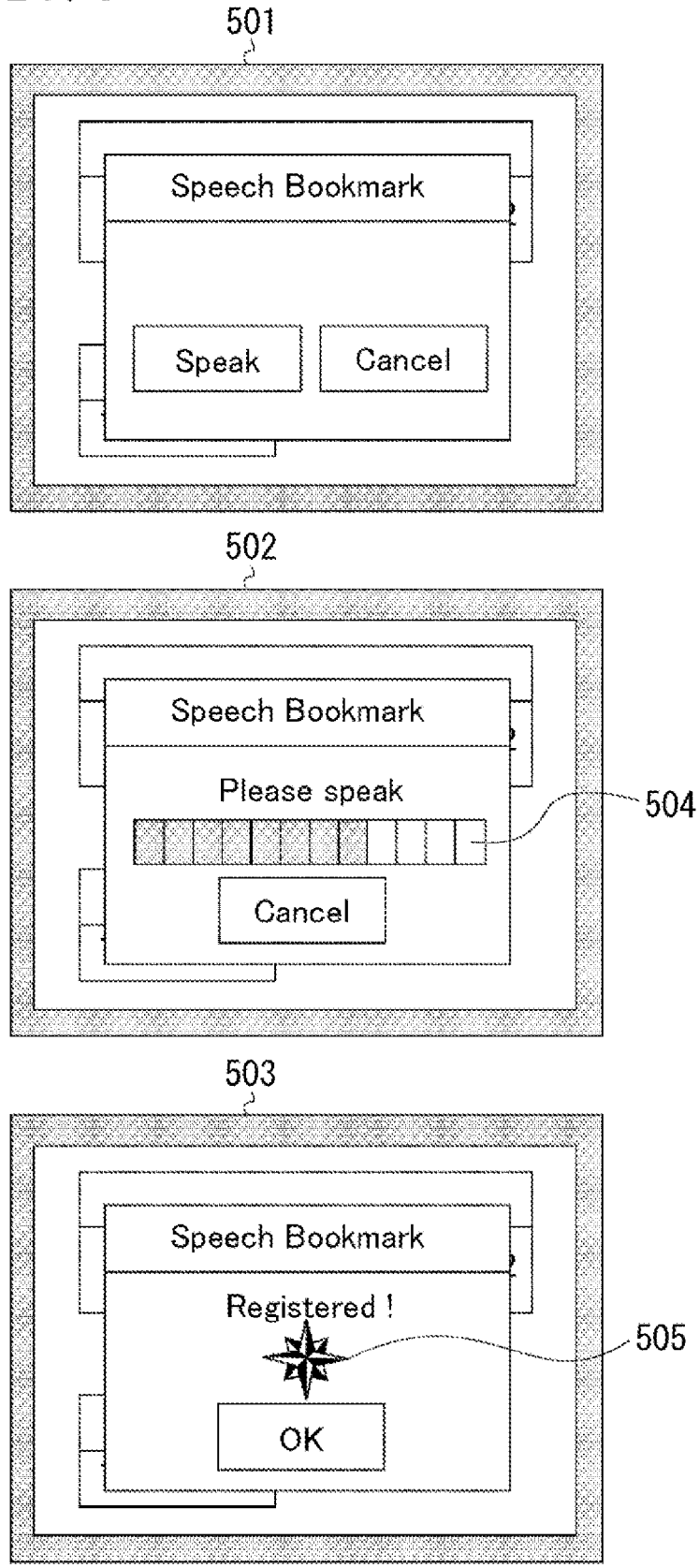
FIG. 5 illustrates an example of a graphical user interface (GUI) of a copying machine in a speech registration phase according to the second exemplary embodiment of the present invention.

FIG. 5 illustrates a GUI in a speech registration phase. For example, when a user presses the speech bookmark registration button 404, the copying machine activates the speech registration phase and displays a speech bookmark registration screen (1) 501 on the touch screen 402. Consequently, "Speak" and "Cancel" buttons are displayed on the speech bookmark registration screen (1) 501.

When user presses the "Speak" button, the copying machine displays a speech bookmark registration screen (2) 502. The speech bookmark registration screen (2) 502 displays a speech input indicator 504. The copying machine imports speech for registration, which is spoken by the user for a specific length of time, via a microphone 403. The copying machine then imports the present copy setting (i.e., 144%, 12 copies, A4, and Auto) as the speech bookmark target. The copying machine then accesses a speech bookmark database and randomly obtains an identification information number that has not been allocated yet.

FIG. 7 illustrates an example of the speech bookmark database 701. Image icons, which are jpg files, are illustrated inside the parentheses. Suppose that speech bookmarks No. 1 and 2 have been registered before the current speech registration phase. Consequently, identification information Nos. 42 and 19 are already used. Therefore, identification information is allocated to the speech bookmark target randomly from the remaining identification information (from No. 1 to No. 256 except Nos. 42 and 19). In the current speech registration phase, identification information No. 27 is allocated to the speech bookmark target.

The copying machine then registers the speech bookmark, using the identification information No. 27, the obtained speech for registration, and the imported copy setting (i.e., 144%, 12 copies, A4, and Auto), onto the speech bookmark database. For example, the copying machine registers a speech bookmark such as No. 3 in FIG. 7. The copying machine then displays a speech bookmark registration screen (3) 503 to indicate the completion of the speech bookmark. It is desirable that the speech for registration is stored in a file such as Speech03.wav. After the speech bookmark is registered, identification information No. 27 (i.e., an icon 505) which has been registered can be output from a screen or a speaker.

<Speech Calling Phase>

Figure 6:
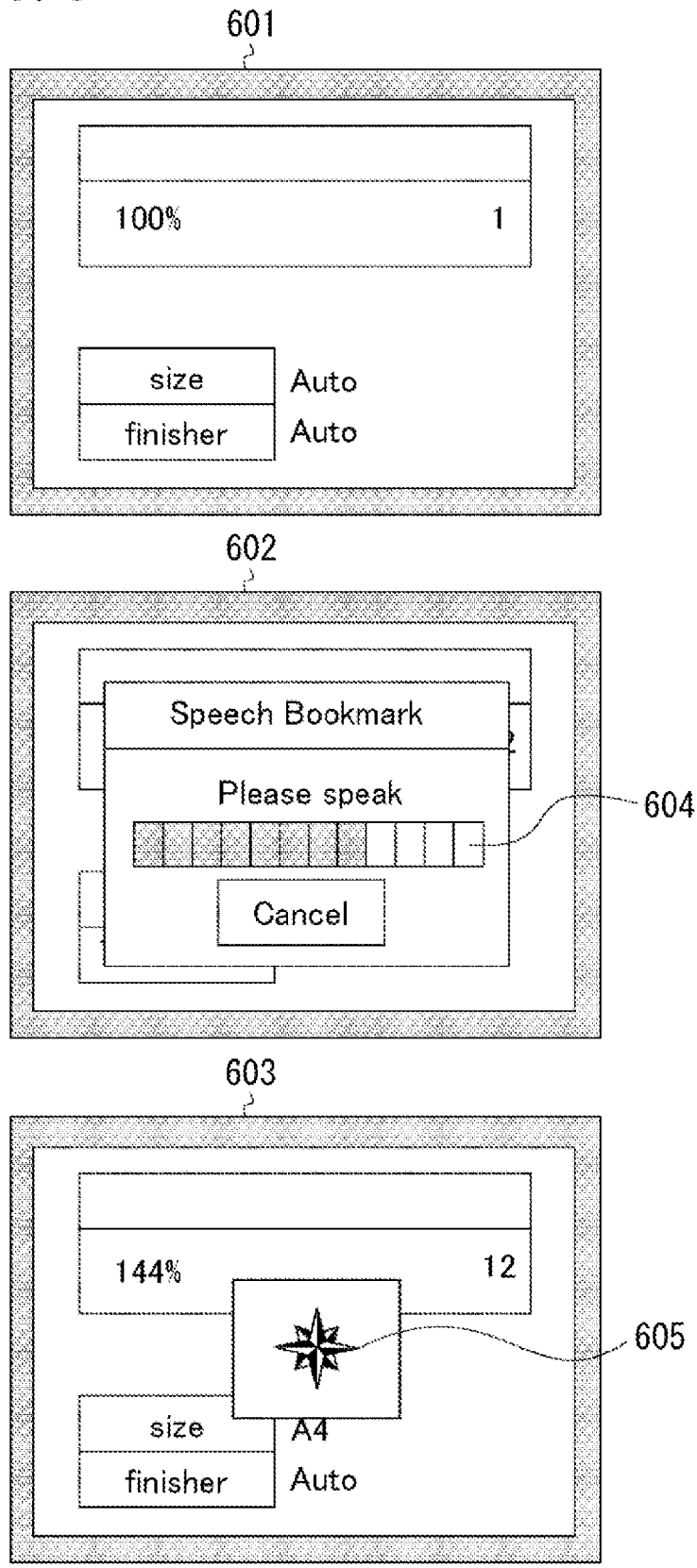
FIG. 6 illustrates an example of a GUI of a copying machine in a speech calling phase according to the second exemplary embodiment of the present invention.

FIG. 6 illustrates an example of a GUI in a speech calling phase. Before entering the speech calling phase, the GUI displays an initial screen 601 in which no copy setting have been made. When the user presses the speech bookmark calling button 405 illustrated in FIG. 4, the copy machine activates the speech calling phase and displays a speech bookmark calling screen 602. The copy machine then imports speech for calling, which a user has spoken for a specific length of time. The copy machine can also display a speech input indicator 604 when importing the speech.

After importing the speech for calling, the copying machine accesses the speech bookmark database and selects speech bookmark information which includes speech for registration that is most similar to the speech for calling. For example, if the speech for registration that is most similar to the speech for calling is Speech03.wav illustrated in FIG. 7, the copying machine assumes that the speech bookmark No. 3 in the speech bookmark database is called. Thus, the copying machine retrieves the corresponding copy setting (i.e., 144%, 12 copies, A4, and Auto) and the identification information No. 27.

The copying machine then executes the copy setting (i.e., 144%, 12 copies, A4, and Auto) as illustrated in a speech bookmark content execution screen 603. Additionally, the copying machine outputs the identification information No. 27 (i.e., an icon 605). The output of the identification information can end after a specific length of time, or can end according to a user operation.

Figure 8:
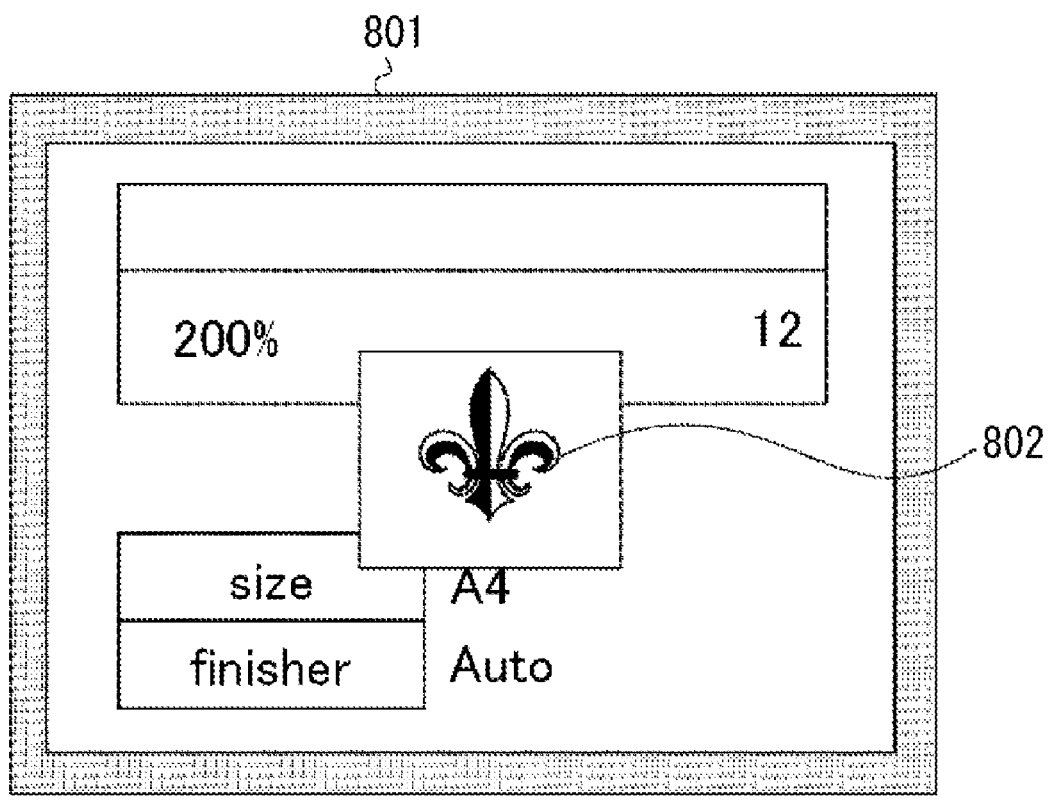
FIG. 8 illustrates an example of a GUI of a copying machine in a speech calling phase according to the second exemplary embodiment of the present invention.

FIG. 8 illustrates a case where a speech bookmark which a user did not intend to call is selected by the copying machine.

In this example, although the user intended to call the speech bookmark No. 3, the copying machine determines that the speech for registration which is most similar to the speech for calling is Speech01.wav due to background noise or hesitation in speech. Therefore, the speech bookmark No. 1 is selected from the speech bookmark database 701 in FIG. 7. The copy settings registered in No. 1 and No. 3 differ only in the copy ratio setting, and the difference is unclear at first glance. However, the difference becomes clear if the identification information No. 42 (i.e., an icon 802) is output when the copy setting is executed as displayed on a speech bookmark execution screen 801.

As described above, when a speech bookmark is called, the copying machine outputs the identification information which is allocated to the speech bookmark when registering the speech bookmark onto a speech bookmark database. Therefore, if a user calls a speech bookmark and the copying machine selects a copy setting which is different from what the user has demanded, the user can immediately notice the error.

In the second exemplary embodiment, the present invention is applied to a copying machine. However, the present invention is not limited to the above-described embodiments.

For example, the present invention can be applied to a television viewing application, in which a speech bookmark target can be a specific channel number, program information, or an electronic program guide (EPG) search query.

Moreover, the present invention can be applied to a search application, in which a speech bookmark target can be a specific search query or search result.

Furthermore, the present invention can be applied to an application that requires entering information on a form, in which a speech bookmark target can be a specific set of input values.

In the above-described exemplary embodiments, when speech is registered, identification information is selected randomly from identification information that is not currently registered on the speech bookmark database. Alternatively, identification information that is determined uniquely in the order of registration is selected. However, the selection of identification information is not limited to the above-described methods.

Identification information that is already allocated to a speech bookmark can be allocated to another speech bookmark. For example, when identification information which has not been allocated many times to speech bookmarks is newly allocated to a speech bookmark, the identification information does not become much less identifiable. Additionally, the same identification information can be allocated to speech bookmarks that are registered on the same day (or in the same week). As a result, the day (week) of the registration can be determined by looking at (or hearing) the identification information.

When speech is registered, identification information can be selected by considering information on the speech for registration (e.g., length of speaking time, fundamental frequency, speech recognition result, or speaker class).

Figure 9:
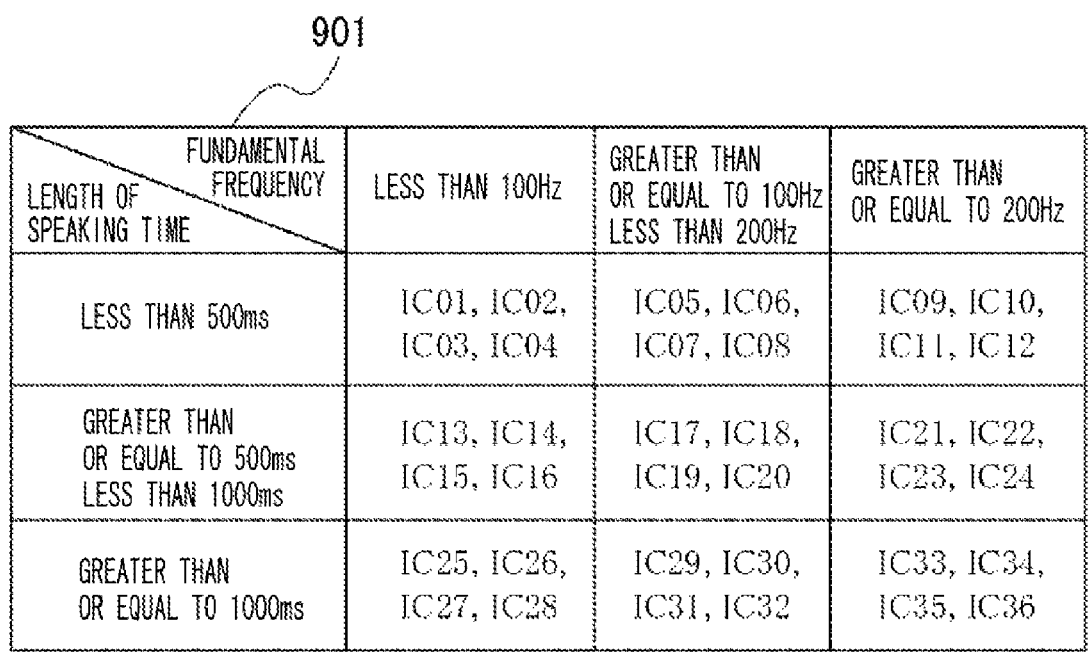
FIG. 9 illustrates an example of a table for selecting identification information according to the present invention.

FIG. 9 is an example of a table 901 for selecting identification information from information on the speech for registration (i.e., length of speaking time and fundamental frequency). Identification information corresponding to speech for registration can be allocated by analyzing the speech for registration and collating the speech for registration with the table.

For example, speech for registration can have the following features:
fundamental frequency: 150 Hz
length of speaking time: 700 ms
In this case, identification information is selected from identification information Nos. 17 to 20. An identification information number which is not being used can be selected from among the above-described identification information and be allocated.

Moreover, all of the identification information that is included in one box of the table 901 illustrated in FIG. 9 can be unified into the same type of information (e.g., all blue images or all animal calls). Consequently, the same type of identification information is always allocated to a speech registered by a specific user. Therefore, when a user calls by speech and an unfamiliar type of identification information is output, the user can instantly notice that the speech is different from the speech that the user has registered.

When speech is registered, identification information can be selected by considering information on the speech bookmark target (e.g., type of object, type of URL domain, GUI layer, and content of setting value).

FIG. 10 illustrates an example of a table 1001 for selecting identification information from information on the speech for registration (i.e., length of speaking time) and information on the speech bookmark target (i.e., number of copies). With this table, identification information can be allocated based on the speech for registration and the speech bookmark target.

For example, the information on the speech for registration and the information on the speech bookmark target can have the following values:
number of copies: 12 copies
length of speaking time: 400 ms
In this case, the identification information is selected from Nos. 9 to 12. An identification information number which is not being used can also be selected and allocated.

The identification information in the above-described exemplary embodiments includes an image or sound. However, the identification information is not limited to those, and other information such as text information can also be allocated. In a device which includes a force feedback function, a vibration pattern can be the identification information. In a device which includes light, the color or the flashing pattern of the light can be the identification information. In a system which includes a speech synthesis apparatus, the content of the speech synthesis can be the identification information.

The speech bookmark target in an information processing apparatus according to an exemplary embodiment of the present invention can be a series of command sequence.

Figure 11A:
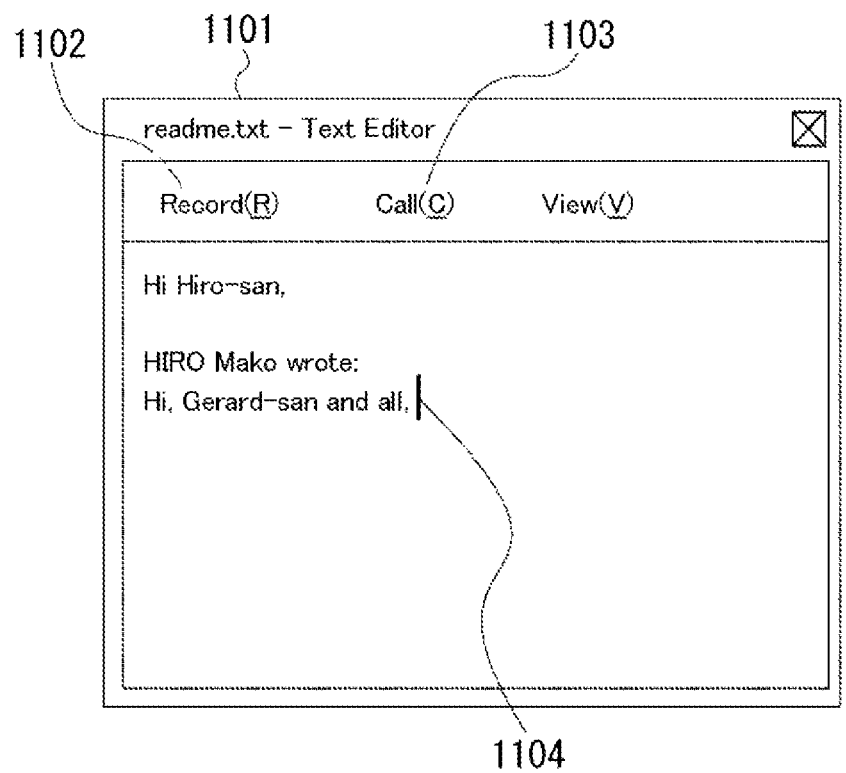
FIGS. 11A and 11B illustrate an example of a text editor during editing of text according to the present invention.
Figure 11B:
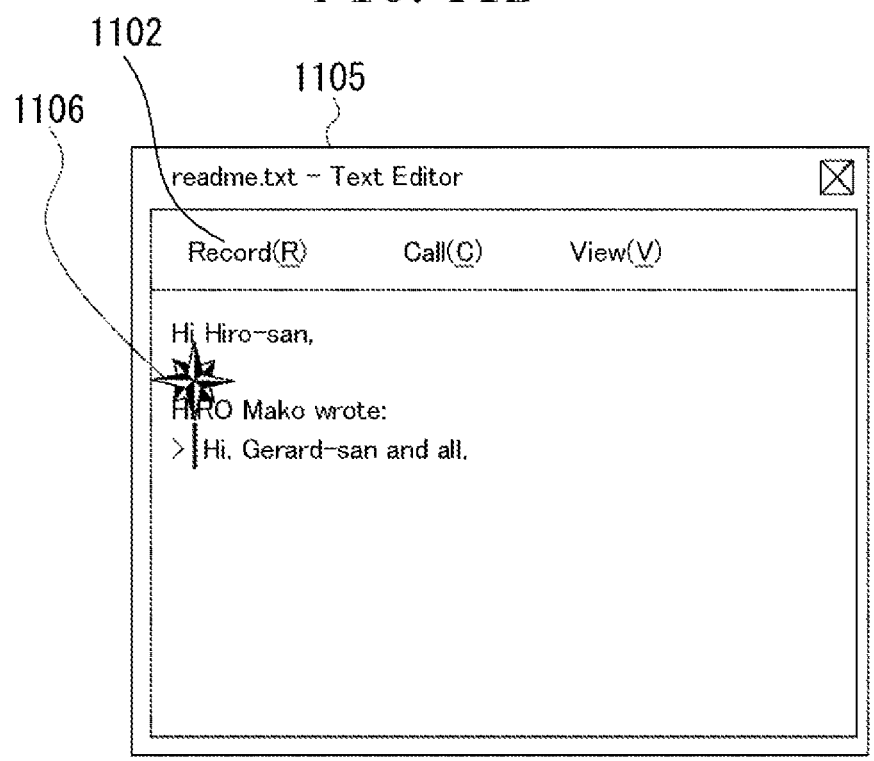

FIGS. 11A and 11B illustrate text editors 1101 and 1105 that run on a personal computer (PC). The image processing apparatus is embedded in the text editors 1101 and 1105. The text editors 1101 and 1105 include a macro registration button 1102. When a user clicks the macro registration button 1102, a dialog that prompts a user to write a command sequence is displayed. The user then writes a series of command sequence and registers speech via a microphone connected to the PC. The information processing apparatus then registers the command sequence written by the user, the selected identification information, and the speech for registration associated with each other onto a speech bookmark database. FIG. 13 illustrates an example of a speech bookmark database 1301.

When a user clicks a macro calling button 1103, a dialog that prompts a user to make a speech call is displayed. The user speaks, and a command sequence that has been registered in the past is called and executed. For example, if a user makes a speech corresponding to Speech02.wav (FIG. 13), the information processing apparatus selects the speech bookmark No. 2. A cursor 1104 then moves to the left end and executes the corresponding command sequence that inserts ">" at the cursor position (FIG. 11B). The identification information 1106, which is registered in the speech bookmark No. 2, can be displayed on the cursor 1104 while the series of command sequence is executed.

As described above, a series of command sequence can be a speech bookmark target, thus improving user-friendliness.

Figure 12:
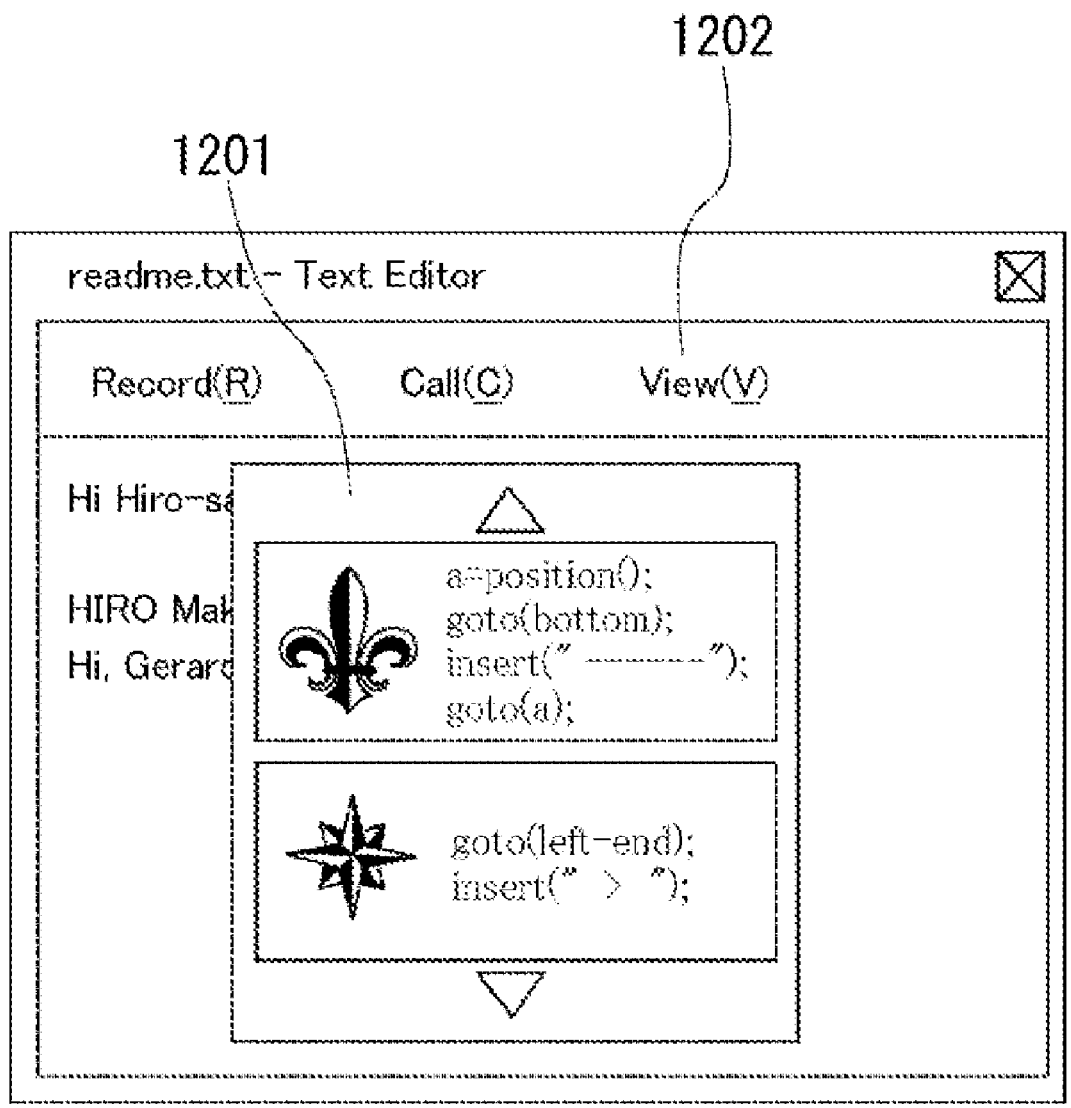
FIG. 12 illustrates an example of a text editor during displaying of a speech bookmark list according to the present invention.

FIG. 12 illustrates an example of a GUI that displays a text editor. By clicking a macro display button 1202 on the text editor, a user can confirm a speech bookmark list 1201, which is stored in a speech bookmark database. Identification information that is registered in association with the registered command sequence can also be displayed together with the command sequence.

Thus, a user can confirm the speech bookmark information together with the identification information, and the speech bookmark information becomes more identifiable.

The present invention can also be achieved by supplying a storage medium storing program code of software which realizes the functions of the above-described exemplary embodiments to a system or an apparatus. The computer (or CPU or MPU) of the system or the apparatus can read and execute the program code stored in the storage medium.

In this case, the program code itself that is read from the storage medium realizes the functions of the above-described exemplary embodiments, and the storage medium that stores the program code can constitute the present invention.

Examples of the storage medium for supplying the program code are a floppy disk, hard disk, optical disk, magnet-optical disk, compact disc read-only memory (CD-ROM), compact disc-recordable (CD-R), magnetic tape, nonvolatile memory card, and read-only memory (ROM).

Furthermore, in addition to realizing the functions of the above-described exemplary embodiments by executing the program code read by a computer, the present invention includes also a case in which an operating system (OS) running on the computer performs a part or the whole of actual processing according to instructions of the program code to realize the functions of the above-described exemplary embodiments.

Furthermore, the present invention includes also a case in which, after the program code is read from the storage medium and loaded onto the memory in a function extension unit board inserted in the computer or a function extension unit connected to the computer, a CPU in the function extension board or the function extension unit performs a part of or the entire processing according to the instructions of the program code to realize the functions of the above-described exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-329621 filed Dec. 6, 2006, which is hereby incorporated by reference herein in its entirety.

What is claimed is:

1. An information processing apparatus comprising:
   at least one processor programmed to control:
   a registration target obtaining unit configured to obtain data to be registered;
   a first speech obtaining unit configured to obtain speech for registration;
   a selecting unit configured to select identification information from an identification information database that stores a plurality of identification information when the first speech obtaining unit has obtained the speech for registration;
   a storing unit configured to store, in a memory, the selected identification information, the speech for registration, and the obtained data to be registered in association with each other;
   a second speech obtaining unit configured to obtain speech for calling;
   a search unit configured to search the memory based on the speech for calling obtained by the second speech obtaining unit and to obtain identification information and data to be registered stored in association with speech for registration corresponding to the speech for calling; and
   a first output unit configured to output the identification information obtained by the search unit.

2. The information processing apparatus according to claim 1, wherein the selecting unit randomly selects identification information from identification information which is not stored in the memory by the storing unit among identification information stored in the identification information database.

3. The information processing apparatus according to claim 1, wherein the selecting unit selects identification information which is determined by the number of times of past registration thereof from among identification information stored in the identification information database.

4. The information processing apparatus according to claim 1, further comprising a second output unit configured to output identification information selected by the selecting unit.

5. The information processing apparatus according to claim 1, further comprising a first analyzing unit configured to analyze speech information of the speech for registration, wherein the selecting unit selects identification information based on the speech information analyzed by the first analyzing unit.

6. The information processing apparatus according to claim 5, wherein the speech information includes at least one of a length of speaking time, a fundamental frequency, speech content, or a speaker class.

7. The information processing apparatus according to claim 5, wherein the registration information includes at least one of a type of object, a type of Uniform Resource Locator (URL) domain, a graphical user interface (GUI) layer, or content of a setting value.

8. The information processing apparatus according to claim 1, further comprising a second analyzing unit configured to analyze the obtained data to be registered,
wherein the selecting unit selects identification information based on the analysis result of the second analyzing unit.

9. The information processing apparatus according to claim 1, wherein the data to be registered includes at least one of a command sequence, a channel number in a television viewing application, television program information, a search query in a search application, a search result, or a set of input values in an application which enters information into a form.

10. The information processing apparatus according to claim 1, wherein the identification information includes at least one of an image, sound, text, a vibration pattern of a vibrating device, or a flashing pattern of light.

11. A method comprising:
using at least one processor to perform the following:
obtaining data to be registered;
obtaining speech for registration;
selecting identification information from an identification information database that stores a plurality of identification information when the speech for registration has been obtained;
storing, in a memory, the selected identification information, the speech for registration, and the obtained data to be registered in association with each other;
obtaining speech for calling;
searching the memory based on the speech for calling to obtain identification information and data to be registered stored in association with speech for registration corresponding to the speech for calling; and
outputting obtained identification information.

12. A non-transitory computer-readable storage medium storing computer-executable process steps, the computer-executable process steps causing a computer to execute the method of claim 11.

* * * * *